June 25, 1963  M. C. MAGARIAN  3,095,092
HOLDER FOR TOOLS AND THE LIKE
Filed Nov. 21, 1960

MASICK C. MAGARIAN
INVENTOR
HUEBNER & WORREL
ATTORNEYS
BY Richard M. Worrel

United States Patent Office 3,095,092
Patented June 25, 1963

3,095,092
HOLDER FOR TOOLS AND THE LIKE
Masick C. Magarian, P.O. Box 494, Fresno, Calif.
Filed Nov. 21, 1960, Ser. No. 70,621
6 Claims. (Cl. 211—60)

The present invention relates to a holder for tools and the like and more particularly to such a holder adapted dependably releasably to support thereon a plurality of tools in spaced, readily selectable relation to each other.

Garden and farm hand tools, such as rakes, shovels, hoes and the like, normally provide elongated handles and present problems of storage so as to be conveniently available. It is common practice to stack such tools in a corner or against a wall with the result that the handles become crossed and their working heads entangled. This presents a problem in selecting the desired tool. Furthermore, such arrangement frequently causes damage to the blades or working heads of the tools.

In the past, conventional holders have provided means loosely to receive the handles of such tools in spaced relation to each other. The tools are located in such holders in either of two manners. Frequently the working heads or blades are supported above the holders with the handles downwardly extended therefrom in holder engagement. Such arrangement has been hazardous. When the tools are inadvertently displaced, the handles strike the floor or ground and the working heads or blades pivot downwardly in a manner difficult to avoid. When one such tool falls, it frequently dislodges adjacent tools with aggravation of the hazard and appreciable inconvenience. Conversely, when such tools are oppositely arranged with their working heads or blades rested on the floor or ground with the handles upwardly extended through the holders, the heads are frequently stepped on or tripped over and the handles caused to swing downwardly with great force. In each situation, convenience and safety are insufficiently achieved.

It is therefore an object of the present invention to provide a tool holder adapted releasably to retain a plurality of tools in spaced relation from each other in a dependable manner.

Another object is to provide a holder which dependably guides the entry of tools therein.

Another object is to provide a tool holder having a releasable latch which dependably holds the tools in the holder.

Another object is to provide a tool holder which supports the weight of such tools independent of the latching means.

Another object is to provide a tool holder which is adapted to retain tools thereon in upright or inverted position.

Another object is to provide a tool holder which is economical to manufacture, easily assembled, and conveniently used.

Other objects and advantages of the present invention will become more fully apparent in the subsequent description in the specification.

Figure 1:
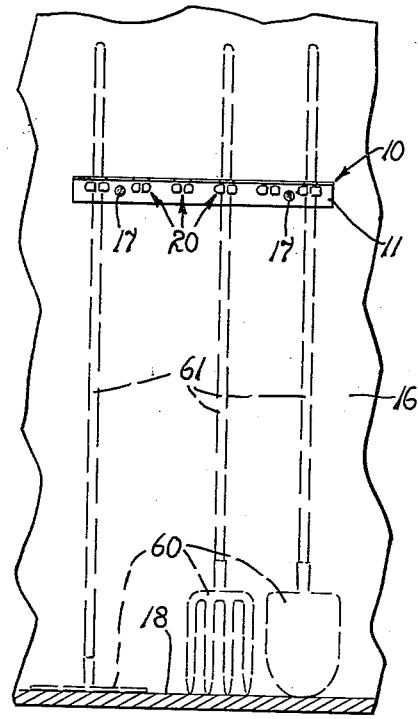
FIG. 1 is a fragmentary front elevation showing a holder embodying the principles of the present invention mounted on a wall and supporting a variety of tools illustrated in dashed lines.
Figure 2:
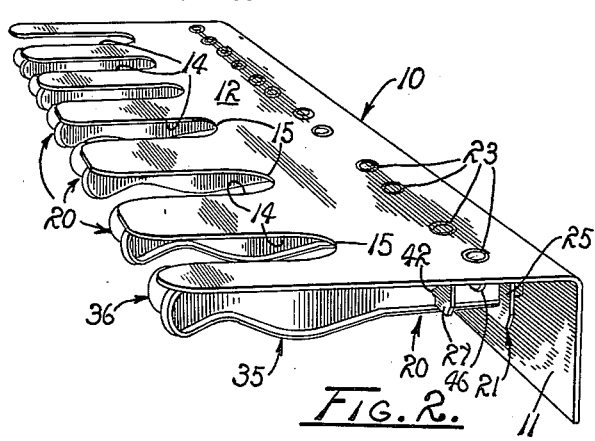
FIG. 2 is a somewhat enlarged perspective view of the holder of FIG. 1.

Referring in greater detail to the drawing, the tool holder embodying the principles of the present invention includes a substantially rectangular support shelf 10 having an integral mounting flange 11 extended therefrom in substantially right angular relation. The shelf further includes a top surface 12 and a bottom surface 13 and has a plurality of equally spaced slots or handle receptacles 14 therein, which open outwardly of the shelf and are thus outwardly disposed from the flange 11. The slots terminate in semi-circular inner ends 15. The flange is adapted to be mounted to a wall 16, as shown in FIG. 1, by a pair of suitable fastening means such as lag screws 17 extended therethrough. The flange thereby positions the shelf in substantially horizontal position in parallel relation to a floor surface indicated at 18.

Figure 3:
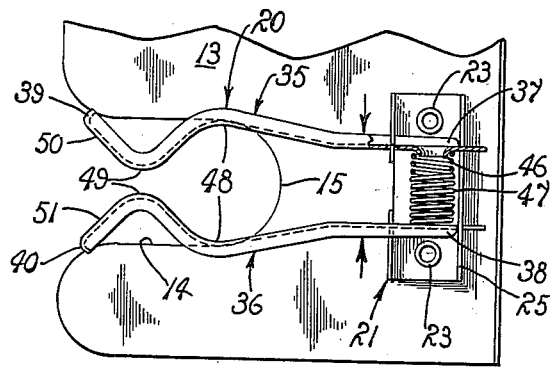
FIG. 3 is a somewhat enlarged fragmentary bottom view of the holder of FIG. 1 showing a latch embodying the principles of the present invention mounted thereon.
Figure 5:
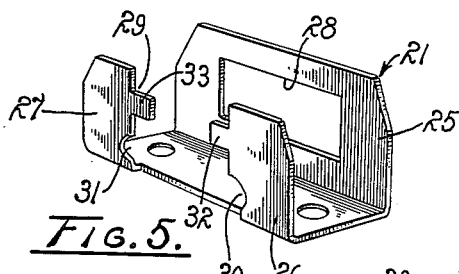
FIG. 5 is a somewhat enlarged perspective view of a bracket for mounting the latch mechanism in assembled relation.
Figure 4:
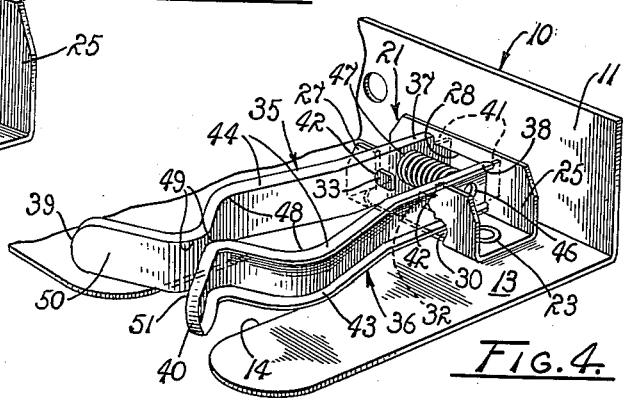
FIG. 4 is a fragmentary perspective view of the bottom portion of the holder of FIG. 3.

As shown in FIGS. 3 through 5, a plurality of latch members 20 are carried on the shelf 10 adjacent each of the slots 14. The latches include a substantially U-shaped bracket 21 mounted on the bottom surface 13 of the shelf between the inner ends 15 of the slots and the flange 11 by a pair of rivets 23. The bracket includes a leg 25 and a pair of opposite legs 26 and 27 which project outwardly from the shelf in substantially parallel relation to each other and to the flange 11. It will be evident that each bracket can be easily formed by a stamping operation or, if preferred, may be die stamped from a flat piece of sheet metal and the legs subsequently bent into position by means of a break. The leg 25 includes a central rectangular opening 28 therethrough juxtapositioned to the space 29 defined between the legs 26 and 27. The opening 29 widens near the lower portion of the bracket to form a pair of facing notches 30 and 31 in the legs 26 and 27. A pair of inwardly disposed tabs 32 and 33 extend inwardly of the opening from the legs 26 and 27, respectively, in opposed relation for reasons soon to be described.

A pair of opposed, substantially identical fingers 35 and 36 are releasably mounted on the bracket 21. As best shown in FIG. 4, the fingers 35 and 36 are formed from rigid channel-shaped strips of metal and include inner ends 37 and 38 and outer ends 39 and 40, respectively. The inner ends are notched at 41 in their opposite end edges to receive the portions of the leg at the upper and lower edges of the opening 28 and for slidable movement along said portions of the leg. Forwardly from the notches, an aperture 42 extends through each of the fingers to receive the tabs 32 and 33 which serve as fulcrum points about which the fingers are adapted to be rocked. Each of the fingers includes upper and lower outwardly extended side rails 43 and 44, respectively. When the fingers are inserted in the bracket, the upper rails overlie the top edge of the legs 26 and 27 and the lower rails are received in the notches 30 and 31. An inwardly directed boss 46 is provided on each finger intermediate the inner ends 37 and 38 and the apertures 42. When the fingers are mounted on the bracket, the bosses are aligned and a helical compression spring 47 is fitted thereon under compression between the fingers. The fingers extend outwardly from the bracket in diverging relation adjacent to the sides of the slots 14 to form therebetween a tool holding station 48. Each of the fingers further includes an inwardly directed convex elbow portion 49 outwardly of which the fingers diverge to form camming surfaces 50 and 51. The elbow portions are normally held in engagement by the action of the spring 47 on the opposite side of the fulcrum points 32 and 33.

As best shown in FIG. 3, the spring 47 normally urges the inner ends of the fingers outwardly from each other in abutment with the sides of the central opening 28. At the same time, the portions of the fingers outwardly extended from the tabs 32 and 33 are urged inwardly towards each other. It will be apparent that the elbow portions 49 may be swung outwardly from each other against the force of the spring 47 in effect to open the slots 14 in the shelf. The camming surfaces 50 and 51 adjacent to the outer opening of the notches 12 guide the introduction of tools into the slots whereupon the fingers are automatically actuated towards a closed position by the spring to prevent any inadvertent disengagement of the tool from the holder. As is evident, each of the slots is provided with a latch mechanism of the form described.

*Operation*

The operaton of the described embodiment of the subject invention is believed to be clearly apparent and is briefly summarized at this point. With the holder mounted in the position of FIG. 1, a plurality of tools 60 having handles 61 are rested on the floor surface 18 with their upwardly extended handles received in the slots 14. The handles are guided into the slot by the outer camming surfaces of the latch to wedge the fingers outwardly from each other to open the slot and the elbow portions 49 of the fingers to admit the handles into the holding station 48. When the handle is nested in the semi-circular inner end of its respective slot, the spring 47 in the latch causes the fingers to close about the handle and dependably to retain the tool in an upright position until it is manually actuated outwardly of the slot by sufficient force to again compress the spring. With the flexibility in the latch being provided by the spring 47 and not by the fingers per se, the fingers are always compressed towards each other and are thereby not subject to permanent spreading.

Figure 6:
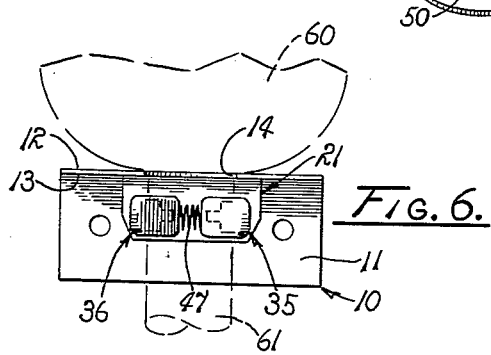
FIG. 6 is a somewhat enlarged fragmentary front elevation of the tool holder shown supporting a tool, represented in dashed lines, inverted from the position of FIG. 1.

As shown in FIG. 6, the tools 60 may also be placed in the holder in inverted position. In this event the working heads of the tools are supported on the shelf 10 with their handles 61 extended downwardly through the slots 14 and are there clamped by the fingers 35 and 36, as before. With the shelf 10 positioned at the proper height, the handles are clear of the floor and offer no obstruction to sweeping, cleaning, or the like.

Whether the tools 60 are placed in the holder as shown in FIG. 1 or as shown in FIG. 6, they are latched in place simply by thrusting the handles 61 inwardly of the fingers 35 and 36 and removed by pulling the handles outwardly. During each movement of placing or removing the tools, the fingers automatically cam themselves open and subsequently close under the urging of the spring 47. Since the tools are never rested on the fingers, the fingers are never damaged or displaced by the weights of the tools.

In addition to the described utility, the holder possesses great facility for assembly and disassembly. To remove the fingers 35 and 36 for repair, replacement, storage or shipment, they are simply grasped by the hand and compressed toward each other. This causes the fingers to pivot inwardly on their elbows 49, compresses the spring 47, disengages the apertures 42 from the tabs 31 and 32, and permits withdrawal of the inner ends of the fingers from the opening 28.

The assembling is just as simple and permits significant economies of production. The fingers are held in their normal facing relation, the spring 47 is fitted over the bosses 46 and compressed by pressing the fingers together. The inner ends of the fingers are then inserted into the opening 28 until the notches 41 are properly positioned and the apertures 42 aligned with the tabs 31 and 32. So positioned, the fingers are released and the spring dependably holds them in position on the tabs 31 and 32.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A tool holder comprising a support shelf having a mounting portion extended therefrom, said shelf including an elongated slot opening outwardly of the shelf opposite to said mounting portion adapted to receive a portion of a tool gravitationally supported on the shelf; a substantially U-shaped bracket mounted on the shelf and providing an upstanding leg, a pair of opposite legs, each of said opposite legs having a respective tab projecting therefrom toward the other in opposed relationship, a pair of fingers each having an aperture adapted loosely to receive a respective one of said tabs, and thereby being pivotally connected to the bracket, disposed adjacent to said slot and beneath the shelf, and including inwardly bent portions in close juxtaposition to the slot, and resilient means engaging said fingers to close said bent portions to retain tools therein.

2. A tool holder comprising a substantially horizontal shelf having a mounting flange integral therewith and angularly extended therefrom, said shelf having a slot therethrough opening outwardly from the shelf opposite to said flange adapted to receive a portion of a tool gravitationally rested on the shelf; a bracket mounted on the shelf adjacent to the included angle formed between the shelf and the flange; a pair of clamping fingers pivotally retained on the bracket beneath the slot, extended towards said slot opening, and having inwardly directed bent portions juxtapositioned in closing relation to the slot, said fingers having outer ends adjacent to said slot opening and extended from said bent portions in outwardly diverging relation to provide camming surfaces for guiding such tools inwardly between the bent portions; cooperating means on each of the fingers and the bracket to prevent longitudinal movement of the fingers; and a compression spring disposed between the fingers in the bracket releasably to close said fingers at their bent portions so as to retain the tool in the slot and on the shelf.

3. A tool holder comprising a substantially horizontal support shelf having a mounting flange integral therewith, said shelf including an elongated slot therethrough opening outwardly of the shelf opposite to said flange adapted to receive a portion of a tool gravitationally rested on the shelf; a substantially U-shaped bracket mounted beneath the shelf between the slot and the flange and having a pair of oppositely spaced legs substantially parallel to said flange, one of the legs having a central opening therethrough and said opposite leg being bifurcated to provide spaced inwardly directed tabs; a pair of fingers having opposite inner and outer ends and forming therebetween a restricted opening adjacent to their outer ends, said inner ends individually providing notches received in the opening in said one leg and aligned apertures fitted over said tabs about which the fingers are fulcrumed; and a compression spring held between said inner ends in the bracket to urge said fingers into releasable closing relation at the restricted opening, and said outer ends being outwardly extended from said restricted opening in diverging relation to each other to provide camming surfaces for guiding such tools into the opening whereby the fingers are spread against the force of the spring to permit entry of the tool between the fingers and into the slot in the shelf.

4. The combination of a bracket having a base providing substantially parallel opposite edges, a first leg integral with the base extended substantially right angularly therefrom along one edge, and a pair of second legs integral with the base extended from the opposite edge of the base in substantially parallel relation to the first leg, the second legs being in spaced relation to define an opening therebetween, said first leg having a substantially rectangular opening therethrough in alignment with the opening defined between the second legs, and the second legs having a pair of aligned tabs extended therefrom into the opening defined therebetween and disposed in substantially parallel relation to the base; a pair of elongated fingers extended between the second legs and having ends of reduced width slidably extended into the opening of the first leg, said fingers having apertures therein individually fitted over the tabs; and a compression spring mounted between the fingers in substantially parallel relation between the first leg and said pair of second legs.

5. A tool holder comprising an elongated channel-shaped member having a base and a pair of substantially parallel legs integral with the base, the legs having openings therein providing spaced substantially parallel facing edges normal to the base, a pair of fingers extended through the openings of the legs providing arcuate cooperative tool gripping portions laterally adjacent to a leg of said member, each finger having a substantially straight portion within the member engaged outwardly against corresponding edges of each leg and each finger having portions engaging the legs to limit longitudinal movement of the fingers, a compression spring positioned between the fingers within the member and holding the fingers outwardly against the edges with which they are engaged, and means retaining the spring in said finger engaging position whereby the tool gripping portions of the fingers can be separated to receive or to release a tool by pivoting the fingers about the respective edges of the leg adjacent to said gripping portions and compressing the spring, and whereby engagement of the fingers with the respective edges of the opposite leg limits movement of the gripping portions of the fingers toward each other under the urgency of the spring.

6. A tool holder comprising a support shelf having a mounting portion angularly related thereto, bracket means rigidly secured to the shelf and providing a first leg affording an opening therein to provide longitudinally spaced oppositely facing edges, the bracket means further providing a pair of members opposing said first leg, each of said pair affording a facing edge opposed to the other, the facing edges of said bracket means being arranged in corresponding pairs, the edges of each pair being aligned in a respective plane generally transversely related to said first leg, a pair of fingers, each finger engaging a respective one of the facing edges of said pair of members, the edges thereby serving as respective fulcrums for said fingers, the fingers each having an end extended into the opening of said first leg, interfitting means carried by said fingers and said pair of members to prevent longitudinal movement of the fingers, each of said fingers providing a cooperative tool gripping portion opposite to said extended end and adjacent to a respective one of said pair of members, and a resilient compression element positioned between said first leg and said pair of members and having opposite ends engaged outwardly against the fingers to urge each of the fingers outwardly against its respective facing edge serving as a fulcrum.

References Cited in the file of this patent

UNITED STATES PATENTS

| | | |
|---|---|---|
| 338,248 | Capron | Mar. 23, 1886 |
| 1,128,593 | Fort | Feb. 16, 1915 |
| 1,151,084 | Childs | Aug. 24, 1915 |
| 1,968,462 | Merhell | July 31, 1934 |
| 2,028,694 | Spinks | Jan. 21, 1936 |
| 2,035,639 | Davis | Mar. 31, 1936 |
| 2,483,188 | Elger | Sept. 27, 1949 |
| 2,708,523 | Rozanski | May 17, 1955 |
| 2,819,858 | Mittendorf | Jan. 14, 1958 |

FOREIGN PATENTS

| | | |
|---|---|---|
| 641,003 | Great Britain | Aug. 2, 1950 |